United States Patent
Xu et al.

(10) Patent No.: US 12,424,120 B1
(45) Date of Patent: *Sep. 23, 2025

(54) SIMULATOR JOYSTICK FORCE CALIBRATION METHOD

(71) Applicant: Zhuhai Xiangyi Aviation Technology Company LTD., Zhuhai (CN)

(72) Inventors: Xiaofeng Xu, Zhuhai (CN); Lei Liu, Zhuhai (CN); Cong Chen, Zhuhai (CN); Jie Cao, Zhuhai (CN)

(73) Assignee: Zhuhai Xiangyi Aviation Technology Company LTD., Zhuhai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/221,522

(22) Filed: May 29, 2025

(30) Foreign Application Priority Data

Jul. 24, 2024 (CN) .......................... 202410993287.6

(51) Int. Cl.
    *G09B 9/28* (2006.01)
    *G01L 5/22* (2006.01)
    *G01L 25/00* (2006.01)

(52) U.S. Cl.
    CPC .............. *G09B 9/28* (2013.01); *G01L 5/223* (2013.01); *G01L 25/00* (2013.01)

(58) Field of Classification Search
CPC ........... G09B 9/28; G01L 5/223; G01L 25/00; G01L 25/006; G01L 3/00; G01M 17/0074; G01M 13/00; G01C 25/005; G01C 19/38; G01N 19/02; G04C 3/14; G01B 5/004; G06F 30/15; G06F 3/016; G06F 3/011; G06F 3/0334; G08B 6/00; G05G 9/047

See application file for complete search history.

(56) References Cited

U.S. PATENT DOCUMENTS

| | | | |
|---|---|---|---|
| 2012/0176315 A1* | 7/2012 | Cordes ................. | G06F 3/0234 345/161 |
| 2020/0276499 A1* | 9/2020 | Black .................... | A63F 13/285 |

FOREIGN PATENT DOCUMENTS

| | | | |
|---|---|---|---|
| CN | 101769808 A | * | 7/2010 |
| CN | 108168774 A | | 6/2018 |
| CN | 114756961 A | | 7/2022 |

(Continued)

*Primary Examiner* — Brandi N Hopkins
(74) *Attorney, Agent, or Firm* — Bayramoglu Law Offices LLC

(57) ABSTRACT

A simulator joystick force calibration method aims to solve problems such as low simulation fidelity of joystick forces that compromises training effectiveness, lack of a fixed reference standard, and the positioning of measurement sensors that leads to non-intuitive force sensing data with significant deviations. The method includes: recording joystick forces at all positions via sensors connected in a joystick; obtaining actual flight force feedback from a standard aircraft instructor; determining whether the joystick forces are normal; if yes, moving, based on different positions of a force measurement surface, the joystick to different angles by dynamometers; recording joystick force values displayed on the dynamometers at each angle, and comparing the joystick force values with corresponding verified normal simulator data; and calculating an average as a standard simulator joystick force parameter. The method can rapidly identify and correct joystick force deviations, and enable dynamic adjustments based on actual flight feedback.

7 Claims, 4 Drawing Sheets

(56) References Cited

FOREIGN PATENT DOCUMENTS

CN 117804662 A 4/2024
KR 20170060904 A 6/2017

* cited by examiner

SIMULATOR JOYSTICK FORCE CALIBRATION METHOD

CROSS REFERENCE TO THE RELATED APPLICATIONS

This application is based upon and claims priority to Chinese Patent Application No. 202410993287.6, filed on Jul. 24, 2024, the entire contents of which are incorporated herein by reference.

TECHNICAL FIELD

The present disclosure belongs to the field of simulator joystick force measurement and correction, and particularly relates to a simulator joystick force calibration method.

BACKGROUND

Flight simulators are professional devices that provide pilots with realistic training experiences. Through the high-fidelity flight environment provided by the simulator, pilots can simulate various flight scenarios encountered during flight processes of the actual aircraft, thereby improving their flight skills and operational proficiency. The simulation fidelity between the simulator and the actual aircraft directly impacts flight training quality, consequently affecting the flight safety of the actual aircraft.

The simulation fidelity of B737 simulator joystick forces is a highly emphasized issue in current flight training. Pilots frequently report low simulation fidelity and lack of realism in simulator joystick forces during actual simulator training. A joystick is the most critical operating mechanism of the aircraft, requiring manipulation during takeoff, landing, and under special conditions to respond to emergencies. If the simulator joystick forces significantly deviate from those of the actual aircraft, it will inevitably compromise training effectiveness, and may lead to misjudgments in operating the actual aircraft in severe cases, thereby affecting flight safety.

According to the structural design of joystick manipulation by existing simulator manufacturers, although the feedback forces of the joystick can be adjusted via software, flight crews still encounter related issues after joystick force calibration. Existing simulator joystick force parameters lack a relatively fixed reference standard, and the calibration data of simulator joystick forces deviate to varying degrees from the actual joystick forces experienced by pilots at the joystick end.

In prior art, the measurement sensors for simulator joystick forces are located at the force-receiving end. There are multiple mechanical connections between the force-receiving end and the force-applying end of the joystick, resulting in deviations between the forces received at the force-receiving end and those applied at the force-applying end. The force-balance measurement method currently used in simulators has significant drawbacks. This method, based on a comparative measurement principle, employs a known force to balance an unknown force to be measured, so as to derive the value of the force to be measured. In this method, force sensors are disposed at the mechanical transmission end, while the force-applying end is not provided with force sensors, thereby leading to non-intuitive measurement data often with deviations. Due to the lack of a relatively fixed reference standard for simulator joystick force parameters, software-calibrated data exhibit varying degrees of deviation from the forces experienced by pilots at the joystick end. Additionally, since pilots operate different aircraft with varying feedback forces, subjective discrepancies arise in their perception of simulator joystick feedback forces.

In view of the above, the present disclosure proposes a simulator joystick force calibration method.

SUMMARY

The present disclosure aims to solve the aforementioned issues in the prior art. That is, the low simulation fidelity of joystick forces compromises training effectiveness, and there is a lack of a fixed reference standard, resulting in deviations between calibrated joystick forces and the tactile feedback from actual aircraft. Additionally, due to the positioning of measurement sensors, the force sensing data are non-intuitive and exhibit significant deviations. For this reason, the present disclosure provides a simulator joystick force calibration method, including:

step S1: powering on a simulator, activating a hydraulic system, and performing pressurization on elevator hydraulic systems A and B;

step S2: moving a joystick forward and backward, placing the simulator in a neutral position, and ensuring that an angle between an axis of the joystick and an axis of a vertical position falls within a preset angle range;

step S3: disposing a simulator joystick force measurement device on the simulator joystick; disposing dynamometers at multiple positions on a force measurement surface of the simulator joystick force measurement device; moving the joystick by the dynamometers, and maintaining the joystick at a preset elevator position; recording joystick forces at all positions via sensors connected in the joystick; and ensuring that forces applied to move the joystick by the dynamometers remain within a preset range;

step S4: determining whether the joystick force at each position matches a joystick force at a corresponding position of an actual aircraft; if not, proceeding to step S5; and if yes, proceeding to step S6;

step S5: performing, for an elevator position corresponding to a joystick force not matching a joystick force at the corresponding position of the actual aircraft, a joystick force calibration based on a position parameter; and returning to the step S4 after the calibration;

step S6: obtaining actual flight force feedback from a standard aircraft instructor;

determining whether the joystick force is normal; if yes, proceeding to step S7; and if not, returning to the step S5; and step S7: moving, based on different positions of the force measurement surface, the joystick to different angles by the dynamometers; recording joystick force values displayed on the dynamometers at each angle, and comparing the joystick force values with corresponding verified normal simulator data; filtering out abnormal data; calculating an average of remaining multi-angle and multi-position joystick force values as a standard simulator joystick force parameter; and establishing an industry standard.

In some optimal implementations, the moving the joystick by the dynamometers, and maintaining the joystick at a preset elevator position; recording joystick forces at all positions via sensors connected in the joystick; and ensuring that forces applied to move the joystick by the dynamometers remain within a preset range, the joystick forces including a first joystick force and a second joystick force, are implemented as follows:

moving the joystick backward by the dynamometers, maintaining the joystick at a preset elevator position, recording the first joystick force at each position via the sensors connected in the joystick, and ensuring that forces applied to move the joystick by the dynamometers remain within a first preset range;

moving the joystick forward by the dynamometers, and maintaining the joystick at a preset elevator position, recording the second joystick force at each position via the sensors connected in the joystick, and ensuring that forces applied to move the joystick by the dynamometers remain within a second preset range; and determining whether the first joystick force and the second joystick force match joystick forces at corresponding positions of the actual aircraft; if not, proceeding to the step S5; and if yes, proceeding to the step S6.

In some optimal implementations, the simulator joystick force measurement device includes a joystick connection device and the force measurement surface; and two ends of the joystick connection device are disposed on the joystick; the force measurement surface is disposed between the two ends of the joystick connection device; a plane where the force measurement surface is located and a plane where the joystick connection device is located are arranged at an inclination; and the dynamometers are disposed on the force measurement surface and are configured to measure the joystick forces.

In some optimal implementations, the joystick connection device includes first cover plates and a second cover plate;

two first cover plates are symmetrically fixed along a center of the force measurement surface at two sides of the force measurement surface; and the first cover plates are detachably fixed to the second cover plate; and a gap is provided between the first cover plate and the second cover plate; and the joystick connection device is sleeved onto the joystick through the gap.

In some optimal implementations, that the first cover plates are detachably fixed to the second cover plate is structured as follows:

threaded holes are provided in the first cover plate; and bolts are connected to the threaded holes respectively via threads and disposed on the second cover plate.

In some optimal implementations, the threaded holes are arranged symmetrically along a central line of the first cover plate.

In some optimal implementations, a plurality of force measurement holes are disposed on the force measurement surface, and the dynamometers are detachably disposed in the force measurement holes.

In some optimal implementations, the dynamometer passes through the force measurement hole and presses against a dynamometer connector, and the dynamometer connector is detachably fixed to the force measurement hole.

In some optimal implementations, a line connecting midpoints of the plurality of force measurement holes coincides with a symmetry axis of the two ends of the joystick connection device.

In some optimal implementations, the inclination between the plane where the force measurement surface is located and the plane where the joystick connection device is located is calculated based on a neutral position angle of the actual aircraft joystick and a mounting angle of the measurement device.

The present disclosure has the following beneficial effects:

The present disclosure significantly improves simulation accuracy. By directly mounting the force measurement surface and the dynamometers on the joystick, the present disclosure enables more precise measurement of joystick forces. Compared to traditional measurement methods at the force-receiving end, the present disclosure reduces force transmission deviations caused by mechanical connections, and enhances the intuitiveness and accuracy of measurement data. Therefore, the present disclosure significantly improves the simulation fidelity of simulator joystick forces and provides pilots with operational feedback close to actual aircraft.

The present disclosure enhances calibration efficiency and effectiveness. The simulator joystick force calibration method proposed by the present disclosure combines hardware measurement devices and software data analysis, enabling refined calibration before simulator operation to ensure consistency between simulated training and real-flight experiences. This method can not only rapidly identify and correct joystick force deviations, but also enable dynamic adjustments based on actual flight feedback, effectively solving long-standing inconsistencies between calibration data and pilot perception.

The present disclosure standardizes joystick force parameters. By establishing average joystick force values under multiple angles and positions as standard simulator joystick force parameters and forming an industry standard, the present disclosure unifies joystick force criteria for simulator training. The present disclosure provides objective and unified references for different simulator manufacturers and airlines, promoting comprehensive improvements in flight training quality.

The present disclosure increases adaptability and flexibility. The device design of the present disclosure adopts detachable fixation (such as threaded connection between the first cover plate and the second cover plate) and movable dynamometers, providing high adaptability and convenient adjustability for joystick force matching across different simulator models and actual aircraft. This ensures broad applicability of the measurement device and calibration method.

The present disclosure improves flight safety. By enhancing the realism and effectiveness of simulated training, the present disclosure enables pilots to better master aircraft control skills in diverse flight scenarios, reducing operational misjudgments in actual aircraft caused by insufficient simulation training. Therefore, the present disclosure fundamentally elevates flight safety levels and holds significant importance for aviation safety assurance.

BRIEF DESCRIPTION OF THE DRAWINGS

Other features, objectives and advantages of the present disclosure will become more apparent upon reading the detailed description of the non-restrictive embodiments with reference to the following drawings.

DETAILED DESCRIPTION OF THE EMBODIMENTS

Figure 1:
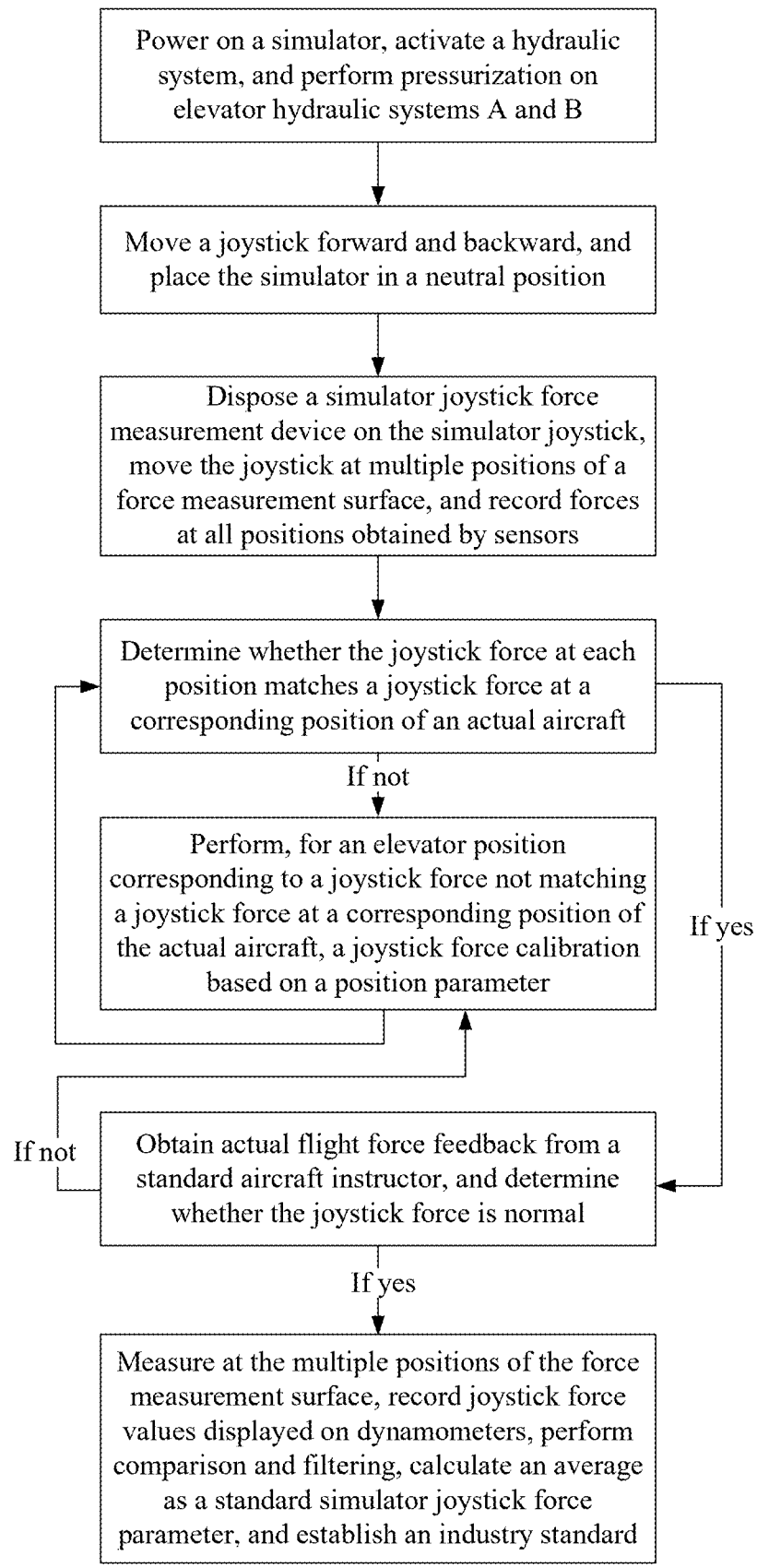
FIG. 1 is a schematic flowchart of a simulator joystick force calibration method according to the present disclosure.

The present disclosure will be further described in detail below in conjunction with the drawings and embodiments. It should be understood that the specific embodiments described herein are merely intended to explain the present disclosure, rather than to limit the present disclosure. It should also be noted that, for convenience of description, only the parts related to the present disclosure are shown in the drawings.

It should be noted that the embodiments in the present disclosure and features in the embodiments may be combined with each other in a non-conflicting situation. The present disclosure will be described in detail below with reference to the drawings and embodiments.

Figure 2:
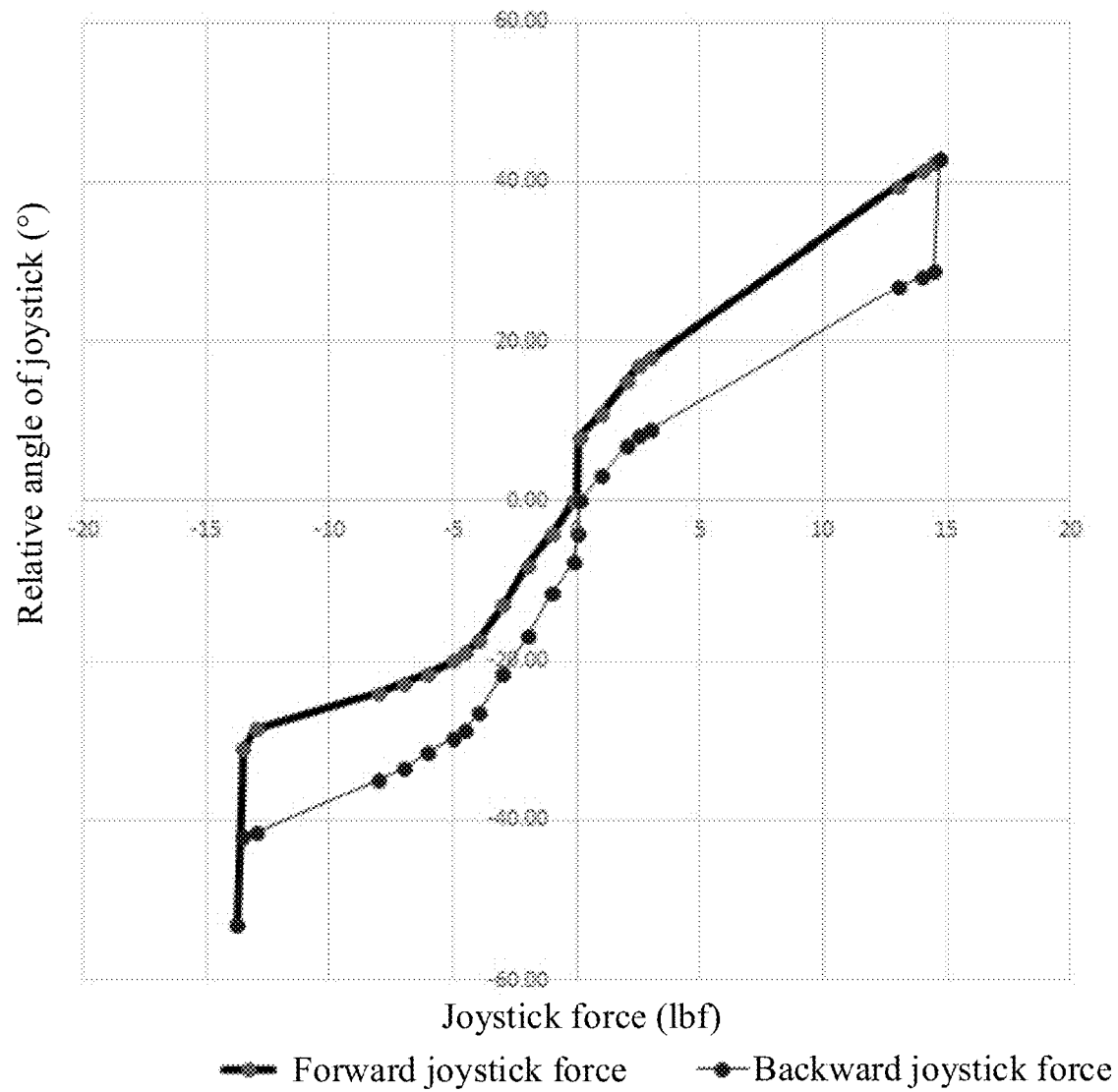
FIG. 2 shows joystick force curves of a single simulator measured under different angles at a single measurement position by the simulator joystick force calibration method according to the present disclosure.

Referring to FIGS. 1 and 2, the present disclosure proposes a simulator joystick force calibration method, which includes the following steps.

Step S1. A simulator is powered on, a hydraulic system is activated, and pressurization is performed on elevator hydraulic systems A and B.

Step S2. A joystick is moved forward and backward to place the simulator in a neutral position, ensuring that an angle between an axis of the joystick and an axis of a vertical position falls within a preset angle range.

Step S3: A simulator joystick force measurement device is disposed on the simulator joystick. Dynamometers are disposed at multiple positions on force measurement surface (2) of the simulator joystick force measurement device. The joystick is moved by the dynamometers and maintained at a preset elevator position. joystick forces at all positions are recorded via sensors connected in the joystick, ensuring that forces applied to move the joystick by the dynamometers remain within a preset range.

Step S4. A determination is made as to whether the joystick force at each position matches a joystick force at a corresponding position of an actual aircraft. If not, the method proceeds to step S5. If yes, the method proceeds to step S6.

Step S5. For an elevator position corresponding to a joystick force not matching a joystick force at the corresponding position of the actual aircraft, a joystick force calibration is performed based on a position parameter. After the calibration, the method returns to the step S4.

Step S6. Actual flight force feedback from a standard aircraft instructor is obtained to determine whether the joystick force is normal. If yes, the method proceeds to step S7. If not, the method returns to the step S5.

Step S7. Based on different positions of the force measurement surface 2, the joystick is moved to different angles by the dynamometers. Joystick force values displayed on the dynamometers at each angle are recorded and compared with corresponding verified normal simulator data. Abnormal data are filtered out. An average of remaining multi-angle and multi-position joystick force values is calculated as a standard simulator joystick force parameter, and an industry standard is established.

In the present disclosure, before the step S1, a determination of whether a joystick force calibration is required is made via a following method. If required, the step S1 is executed.

The determination is made via crew-reported joystick heaviness/lightness, during replacement of a joystick control load (C/L)-related component, or based on joystick-related exceeding tolerance data specified in a quantification test guide (QTG).

The preset angle range is 6.1-7.7 degrees.

In the present disclosure, the joystick force value is a measured joystick force, i.e., a force measured at a force-applying end by the force measurement device of the present disclosure, denoted as $(F_{measured})$.

Joystick forces at all positions recorded by the sensors are forces measured by force sensors at the force-receiving end of the simulator joystick, obtainable via simulator software, and denoted as $(F_S)$.

The standard force parameter of the actual aircraft is a joystick force at a corresponding position of the actual aircraft. It is a standard joystick force model of a B737 aircraft model, a relatively fixed and known force, and inalterable. The force parameter model of the simulator is implemented according to the standard of the actual aircraft. It is denoted as $(F_A)$.

The actual flight force feedback from the standard aircraft instructor is a relatively subjective force feedback. It represents a deviation of the same instructor relative to the actual flight force of the actual aircraft (standard joystick force of standard aircraft+relatively fixed joystick force). This feedback is influenced by various factors such as different actual aircraft joystick forces, different simulator joystick forces, and the physical condition of the standard instructor. The magnitude of excess or deficiency is denoted as $\nabla_{measured}$, where excess is a negative value and deficiency is a positive value.

For deviation forces such as friction, there is certain friction or deviation force between the joystick end force and sensor-measured joystick force in each simulator, denoted as $(F_1)$.

The unit of all forces above is (lbf).

The relationships between these forces are as follows.

1. The relative relationship between the sensor-measured joystick force $F_S$ and the actual aircraft standard force $F_A$:

At a neutral boundary:

$$F_A-2<=F_S<=F_A+2$$

At other positions:

$$(F_A-5<=F_S<=F_A+5) \text{ or } (0.99F_A<=F_S<=1.01F_A)$$

$F_S$ within the above ranges meets General Administration of Civil Aviation of China (CAAC) certification requirements.

2. The relationship between the sensor-measured joystick force and the measured joystick force:

$$F_1=F_{measured}-F_S$$

$F_1$ includes force values such as friction and torque conversion. It is a non-fixed value with limited reference value and is listed here only to clarify the relationship between the two forces.

$F_1$ includes the actual flight force feedback $\nabla_{measured}$ from the standard aircraft instructor.

FIG. 2 illustrates the trend of joystick force changes under different relative angles. The horizontal axis represents relative angles. The vertical axis has two dimensions: the upper dimension indicates forward joystick forces, and the lower dimension indicates backward joystick forces, both in lbf. The figure shows:

As relative angles increase, forward joystick forces gradually increase, while backward joystick forces first decrease and then increase. When relative angles are less than 5 degrees, backward joystick forces exceed forward joystick forces. When relative angles exceed 5 degrees, forward joystick forces surpass backward joystick forces. As angles further increase, forward joystick forces grow larger while backward joystick forces diminish.

Specifically, FIG. 2 primarily describes joystick force variation curves of a single simulator joystick under different relative angles. The relative joystick force intervals and ranges comply with the simulator QTG data requirements.

First, mutual data validation involves consistency in the trend of the simulator joystick force curve with that of the actual aircraft.

Second, a baseline data case (the initial joystick force curve of a single simulator joystick) can be established.

Using this as a reference, final simulator joystick force envelopes are derived through screening and processing of data from multiple simulators, forming an industry standard: standard simulator joystick force parameters.

When the relative angle reaches 20 degrees, the forward joystick force reaches a maximum value of approximately 40 lbf, and the backward joystick force drops to a minimum value of approximately –40 lbf.

In the present disclosure, the joystick is moved by the dynamometers and maintained at a preset elevator position. Forces at all positions are recorded via sensors connected in the joystick. Forces applied to move the joystick by the dynamometers are ensured to remain within a preset range. The joystick forces include a first joystick force and a second joystick force. Specifically:

The joystick is moved backward by the dynamometers and maintained at the preset elevator position. The first joystick force at each position is recorded via the sensors connected in the joystick, ensuring that forces applied to move the joystick by the dynamometers remain within a first preset range.

The joystick is moved forward by the dynamometers and maintained at the preset elevator position. The second joystick force at each position is recorded via the sensors connected in the joystick, ensuring that forces applied to move the joystick by the dynamometers remain within a second preset range.

A determination is made as to whether the first joystick force and the second joystick force match joystick forces at corresponding positions of the actual aircraft. If not, the method proceeds to the step S5. If yes, the method proceeds to the step S6.

The first preset range is shown in Table 1.

TABLE 1

| Elevator position | Required joystick force |
| --- | --- |
| Elevator starts to move | 3 lbf (13.34N)- |
|  | 7 lbf (31.14N) |
| 1.9 in. (48.26 mm)- | 14.5 lbf (64.50N)- |
| 2 in, (50.80 mm) | 21.5 lbf (95.64N) |
| 5.05 in.(128.27 mm)- | 21 lbf (93.41N)- |
| 5.15 in. (130.81 mm) | 27 lbf (120.10N) |

TABLE 1-continued

| Elevator position | Required joystick force |
| --- | --- |
| 9.4 in. (238.76 mm)- | 29.5 lbf (131.22N)- |
| 9.5 in. (241.30 mm) | 36.5 lbf (162.36N) |

The second preset range is shown in Table 2.

TABLE 2

| Elevator position | Required joystick force |
| --- | --- |
| Elevator starts to move | 3.5 lbf (15.57N)- |
|  | 7.5 lbf (33.36N) |
| 1.9 in. (48.26 mm)- | 17.5 lbf (77.84N)- |
| 2 in, (50.80 mm) | 21.5 lbf (95.64N) |
| 5.05 in.(128.27 mm)- | 28.5 lbf (126.77N)- |
| 5.15 in. (130.81 mm) | 35.5 lbf (157.91N) |
| 9.4 in. (238.76 mm)- | 34.8 lbf (154.80N)- |
| 9.5 in. (241.30 mm) | 42.8 lbf (190.38N) |

The above method is performed with C/L connection and hydraulic pressurization.

The following provides a simulator joystick force testing method with C/L connection but no hydraulic system pressurization.

Step A1. The joystick is slowly moved backward, and an elevator trailing edge is maintained at an upward position within a range of 3.59 inches (91.19 mm) to 3.69 inches (93.73 mm).

Step A2. Specific parameters are monitored on the IOS—simulator maint Index-flight control page or in the aircraft engine indicating and crew alerting system (EICAS).

Step A3. The dynamometer ensures that the force fixing the joystick ranges between 11 lbf (48.93 N) and 53 lbf (235.76 N).

In the step A3, the joystick is centered.

Step A4. The captain's joystick is slowly moved forward, and the elevator trailing edge is maintained at a downward position within a range of 3.64 inches (92.46 mm) to 3.74 inches (95.00 mm).

Step A5. The dynamometer ensures that the force fixing the joystick ranges between 19 lbf (84.52 N) and 63 lbf (280.24 N).

In the present disclosure, forward and backward directions of the joystick are defined as follows.

The nose direction is defined as forward, and the opposite direction is defined as backward.

During actual flight operations, pilots primarily operate the joystick under pressurized conditions (in-flight, normal aircraft operation status) (the joystick is not operated on the ground when the aircraft is on the ground). Therefore, the present disclosure primarily references joystick forces under pressurized conditions, and master qualification test guide (MQTG) also mainly references this scenario.

Joystick forces under unpressurized conditions occur only in special situations such as hydraulic system failures. Force sensations under these circumstances may be more influenced by pilot emotions (e.g., stress from aircraft malfunctions) and are for reference only.

Figure 3:
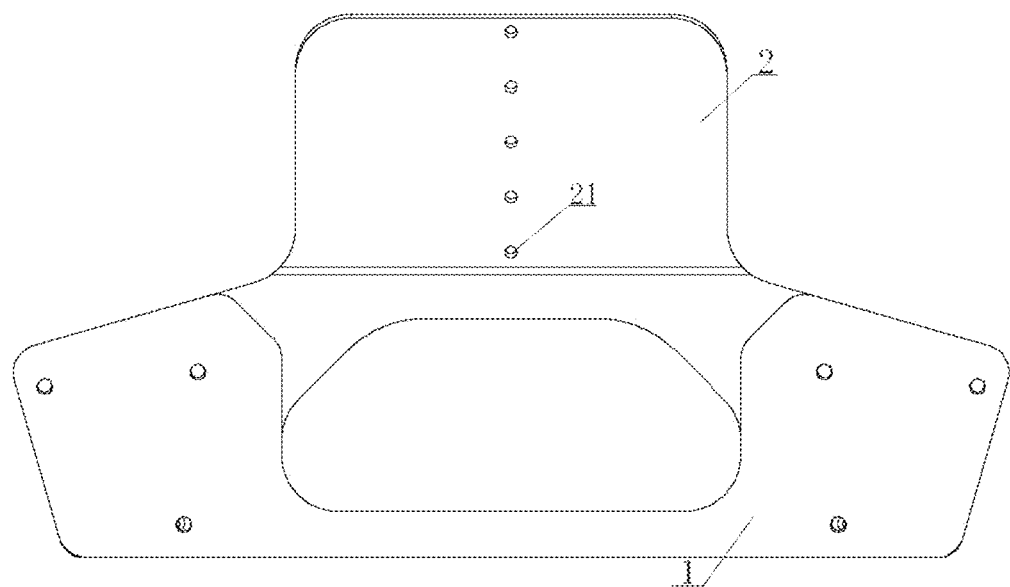
FIG. 3 is a front view of a simulator joystick force measurement device for the simulator joystick force calibration method according to the present disclosure.
Figure 4:
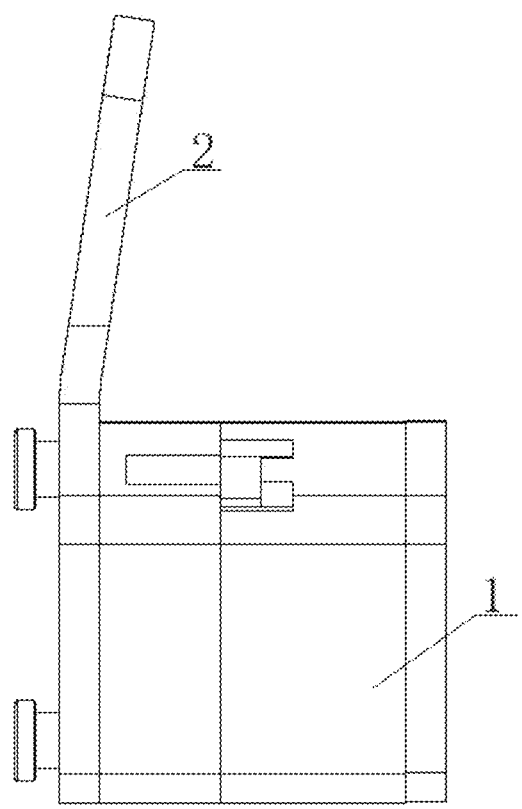
FIG. 4 is a side view of the simulator joystick force measurement device for the simulator joystick force calibration method according to the present disclosure.
Figure 5:
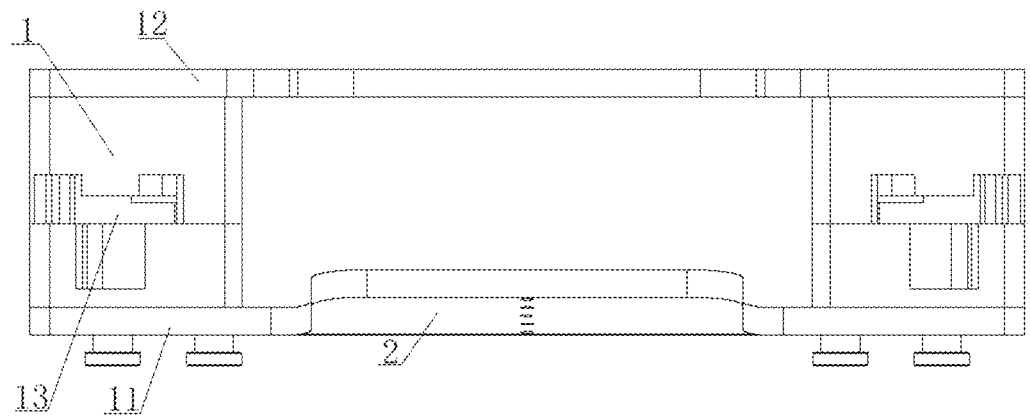
FIG. 5 is a top view of the simulator joystick force measurement device for the simulator joystick force calibration method according to the present disclosure.

As shown in FIGS. 3 to 6, referring to FIGS. 3, 4, and 5, the simulator joystick force measurement device includes joystick connection device 1 and the force measurement surface 2.

Two ends of the joystick connection device 1 are disposed on the joystick. The force measurement surface 2 is disposed between the two ends of the joystick connection device 1. A plane where the force measurement surface 2 is located and a plane where the joystick connection device 1 is located are arranged at an inclination. Dynamometers are disposed on the force measurement surface 2 and are configured to measure joystick forces.

In the present disclosure, the simulator joystick force measurement device is applied to B737 simulators. The joystick connection device 1 is a matching force measurement device designed based on dimensional parameters of B737 simulator joysticks, fully compatible with B737 simulator joysticks, featuring zero clearance and easy mounting/ removal.

In the measurement device, the inclination angle of the force measurement surface 2 is designed. The inclination angle is calculated based on the neutral position angle of the actual aircraft joystick and the mounting angle of the measurement device, ensuring the force measurement surface 2 is fully parallel to the joystick. This inclination design prevents force measurement errors caused by angular misalignment and ensures measurement accuracy.

The device is designed and manufactured via 1:1 modeling of the B737 simulator joystick. Specifically, the inclination design of the force measurement surface 2 and its optional multi-hole measurement positions ensure precise joystick force measurement and eliminate dynamometer misalignment deviations.

The joystick connection device 1 of the present disclosure is primarily a matching force measurement device designed based on dimensional parameters of B737 simulator joysticks. The force measurement surface 2 is parallel to the joystick. The dynamometer is a push-pull dynamometer, and its mounting position directly faces the central axis of the joystick. Actual force sensations during pilot training are measured and used as references by pushing and pulling the joystick forward and backward. Joystick force calibration is performed by combining forces measured by simulator control mechanism force sensors, standard joystick force parameter of the actual aircraft, and actual flight force feedback from standard instructors. The present disclosure enhances the realism of simulator joystick manipulation, achieves optimized training effects, and contributes to flight safety. The present disclosure enables the establishment of a simulator joystick force parameter standard based on this.

The prerequisite for joystick force calibration is compliance with CCAR simulator certification requirements. Referencing the manufacturer's simulator quality test guide (MQTG), the joystick force tolerance range is ±5 lbf or a 10% force difference, with optimal adherence to the joystick force parameter envelope of the actual aircraft. Under this premise, offset compensation is performed on forces measured by the simulator control mechanism force sensors by incorporating joystick force data measured at the force-applying end and actual flight force feedback from the standard instructor, thereby achieving precise joystick force calibration. Finally, statistical integration of calibrated joystick force data from multiple simulators forms the B737 simulator joystick force standard to enhance flight performance and contribute to flight safety.

Figure 6:
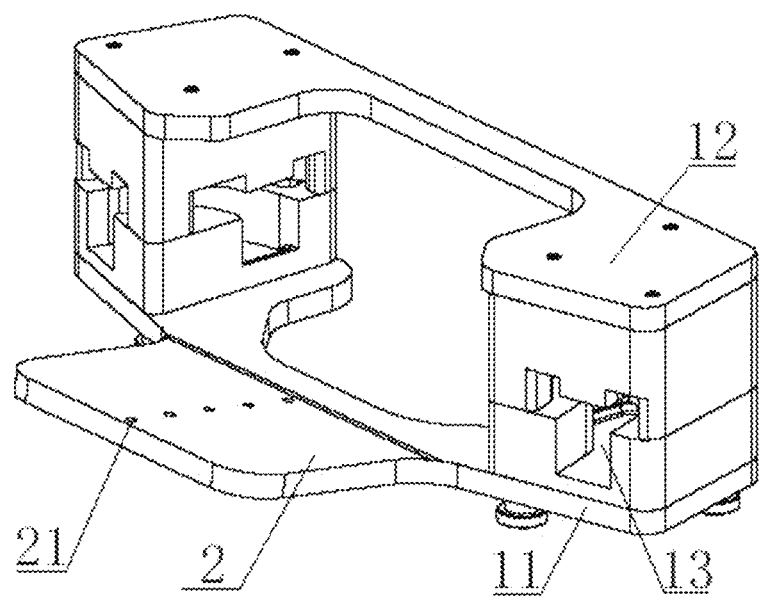
FIG. 6 is an axonometric view of the simulator joystick force measurement device for the simulator joystick force calibration method according to the present disclosure.

As a further explanation of the present disclosure, referring to FIGS. 5 and 6, the joystick connection device 1 includes first cover plates 11 and second cover plate 12.

Two first cover plates 11 are symmetrically fixed along a center of the force measurement surface 2 at two sides of the force measurement surface 2. The first cover plates 11 are detachably fixed to the second cover plate 12.

Gap 13 is provided between the first cover plate 11 and the second cover plate 12. The joystick connection device 1 is sleeved onto the joystick through the gap 13.

As a further explanation of the present disclosure, referring to FIGS. 5 and 6, that the first cover plates 11 are detachably fixed to the second cover plate 12 is structured as follows.

Threaded holes are provided in the first cover plate 11 and bolts are connected to the threaded holes respectively via threads and disposed on the second cover plate 12.

Through the above design, the present disclosure automatically adjusts the width of the gap 13 between the first cover plate 11 and the second cover plate 12, thereby improving the adaptability of the device.

As a further explanation of the present disclosure, referring to FIGS. 5 and 6, the threaded holes are arranged symmetrically along a central line of the first cover plate 11.

As a further explanation of the present disclosure, referring to FIG. 6, a plurality of force measurement holes 21 are disposed on the force measurement surface 2. The dynamometers are detachably disposed in the force measurement holes 21.

Multiple optional dynamometer mounting positions are designed along the central line of the force measurement surface 2. During force measurement, the dynamometers are disposed based on the central position of the actual joystick to facilitate more precise measurement of joystick forces. Averages calculated from measurements at multiple positions yield more accurate joystick forces.

In this embodiment, the present disclosure preferably includes five force measurement holes 21. Those skilled in the art may design more or fewer force measurement holes 21 based on actual requirements. Any number of force measurement holes 21 falls within the protection scope of the present disclosure.

As a further explanation of the present disclosure, referring to FIG. 6, the dynamometer passes through the force measurement hole 21 and presses against a dynamometer connector. The dynamometer connector is detachably fixed to the force measurement hole 21.

The force measurement holes 21 are threaded holes. The dynamometer connectors are threaded rods connected to the force measurement holes 21 via threads, thereby achieving fixation.

As a further explanation of the present disclosure, referring to FIG. 3, a line connecting midpoints of the plurality of force measurement holes 21 coincides with a symmetry axis of the two ends of the joystick connection device 1.

In the present disclosure, specifically, the line connecting the midpoints of the plurality of force measurement holes 21 is parallel to one side edge of the force measurement surface 2 and coincides with the central line of the force measurement surface 2, ensuring that the measured joystick forces are more averaged and accurate.

As a further explanation of the present disclosure, referring to FIG. 4, the inclination between the plane where the force measurement surface 2 is located and the plane where the joystick connection device 1 is located is calculated based on the neutral position angle of the actual aircraft joystick and the mounting angle of the measurement device.

In the description of the present disclosure, terms such as "central", "upper", "lower", "left", "right", "vertical", "horizontal", "inner", and "outer" indicate orientation or position relationships based on the drawings. They are merely intended to facilitate description, rather than to indicate or imply that the mentioned apparatus or components must have the specific orientation and must be constructed and operated in the specific orientation. Therefore, these terms should not be construed as a limitation to the present disclosure. Moreover, the terms "first", "second", and "third" are used only for the purpose of description, and are not intended to indicate or imply relative importance.

In addition, it should be noted that in the description of the present disclosure, unless otherwise clearly specified, meanings of terms "install", "connect with" and "connect to" should be understood in a broad sense. For example, the connection may be a fixed connection, a removable connection, or an integral connection, may be a mechanical connection or an electrical connection, may be a direct connection or an indirect connection via a medium, and may be an internal connection between two components. Those skilled in the art should understand the specific meanings of the above terms in the present disclosure based on specific situations.

Terms "include", "comprise" or any other variations thereof are intended to cover non-exclusive inclusions, so that a process, a method, an article, or a device/apparatus including a series of elements not only includes those elements, but also includes other elements that are not explicitly listed, or also includes inherent elements of the process, the method, the article or the device/apparatus.

The technical solutions of the present disclosure are described in the preferred implementations with reference to the drawings. Those skilled in the art should easily understand that the protection scope of the present disclosure is apparently not limited to these specific implementations. Those skilled in the art can make equivalent changes or substitutions to the relevant technical features without departing from the principles of the present disclosure, and the technical solutions derived by making these changes or substitutions should fall within the protection scope of the present disclosure.

The invention claimed is:

1. A simulator joystick force calibration method, comprising:
    step S1: powering on a simulator, activating a hydraulic system, and performing pressurization on elevator hydraulic systems A and B;
    step S2: moving a joystick forward and backward, placing the simulator in a neutral position, and ensuring that an angle between an axis of the joystick and an axis of a vertical position falls within a preset angle range;
    step S3: disposing a simulator joystick force measurement device on the joystick of the simulator; disposing dynamometers at multiple positions on a force measurement surface of the simulator joystick force measurement device; moving the joystick by the dynamometers, and maintaining the joystick at a preset elevator position; recording joystick forces at all the positions via sensors connected in the joystick; and ensuring that forces applied to move the joystick by the dynamometers remain within a preset range;
    step S4: determining whether the joystick force at each position matches a joystick force at a corresponding position of an actual aircraft; if not, proceeding to step S5; and if yes, proceeding to step S6;
    step S5: performing, for an elevator position corresponding to a joystick force not matching a joystick force at the corresponding position of the actual aircraft, a joystick force calibration based on a position parameter; and returning to the step S4 after the joystick force calibration;
    step S6: obtaining actual flight force feedback from a standard aircraft instructor; determining whether the joystick force is normal; if yes, proceeding to step S7; and if not, returning to the step S5; and
    step S7: moving, based on different positions of the force measurement surface, the joystick to different angles by the dynamometers; recording joystick force values displayed on the dynamometers at each angle, and comparing the joystick force values with corresponding verified normal simulator data; filtering out abnormal data; calculating an average of remaining multi-angle and multi-position joystick force values as a standard simulator joystick force parameter; and establishing an industry standard;
    wherein the simulator joystick force measurement device comprises a joystick connection device and the force measurement surface;
    two ends of the joystick connection device are disposed on the joystick; the force measurement surface is disposed between the two ends of the joystick connection device; a plane where the force measurement surface is located and a plane where the joystick connection device is located are arranged at an inclination; and the dynamometers are disposed on the force measurement surface and are configured to measure the joystick forces;
    the joystick connection device comprises two first cover plates and a second cover plate;
    the two first cover plates are symmetrically fixed along a center of the force measurement surface at two sides of the force measurement surface; and the two first cover plates are detachably fixed to the second cover plate;
    a gap is provided between each of the two first cover plates and the second cover plate; and the joystick connection device is sleeved onto the joystick through the gap; and
    that the two first cover plates are detachably fixed to the second cover plate is structured as follows:
    threaded holes are provided in each of the two first cover plates; and bolts are connected to the threaded holes respectively via threads and disposed on the second cover plate.

2. The simulator joystick force calibration method according to claim 1, wherein the moving the joystick by the dynamometers, and maintaining the joystick at the preset elevator position; recording the joystick forces at all the positions via the sensors connected in the joystick; and ensuring that the forces applied to move the joystick by the dynamometers remain within the preset range, the joystick forces comprising a first joystick force and a second joystick force, are implemented as follows:
    moving the joystick backward by the dynamometers, maintaining the joystick at the preset elevator position, recording the first joystick force at each position via the sensors connected in the joystick, and ensuring that the forces applied to move the joystick by the dynamometers remain within a first preset range;
    moving the joystick forward by the dynamometers, and maintaining the joystick at the preset elevator position, recording the second joystick force at each position via the sensors connected in the joystick, and ensuring that the forces applied to move the joystick by the dynamometers remain within a second preset range; and
    determining whether the first joystick force and the second joystick force match joystick forces at corresponding positions of the actual aircraft; if not, proceeding to the step S5; and if yes, proceeding to the step S6.

3. The simulator joystick force calibration method according to claim 1, wherein the threaded holes are arranged symmetrically along a central line of each of the two first cover plates.

4. The simulator joystick force calibration method according to claim 1, wherein a plurality of force measurement holes are disposed on the force measurement surface, and the dynamometers are detachably disposed in the plurality of force measurement holes.

5. The simulator joystick force calibration method according to claim 4, wherein the dynamometer passes through the force measurement hole and presses against a dynamometer connector, and the dynamometer connector is detachably fixed to the force measurement hole.

6. The simulator joystick force calibration method according to claim 4, wherein a line connecting midpoints of the plurality of force measurement holes coincides with a symmetry axis of the two ends of the joystick connection device.

7. The simulator joystick force calibration method according to claim 1, wherein the inclination between the plane where the force measurement surface is located and the plane where the joystick connection device is located is calculated based on a neutral position angle of an actual aircraft joystick and a mounting angle of the simulator joystick force measurement device.

\* \* \* \* \*